(12) United States Patent
Sagiraju et al.

(10) Patent No.: US 10,666,609 B2
(45) Date of Patent: *May 26, 2020

(54) MANAGEMENT OF DOMAIN NAME SYSTEMS IN A LARGE-SCALE PROCESSING ENVIRONMENT

(71) Applicant: HEWLETT PACKARD ENTERPRISE DEVELOPMENT LP, Houston, TX (US)

(72) Inventors: Krishna C. Sagiraju, San Jose, CA (US); Joel Baxter, San Carlos, CA (US); Swami Viswanathan, Morgan Hill, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/186,841

(22) Filed: Nov. 12, 2018

(65) Prior Publication Data
US 2019/0081921 A1 Mar. 14, 2019

Related U.S. Application Data

(63) Continuation of application No. 14/964,472, filed on Dec. 9, 2015, now Pat. No. 10,129,201.

(51) Int. Cl.
*H04L 29/12* (2006.01)
*G06F 9/50* (2006.01)
(Continued)

(52) U.S. Cl.
CPC ........ *H04L 61/2007* (2013.01); *G06F 9/5077* (2013.01); *G06F 16/00* (2019.01);
(Continued)

(58) Field of Classification Search
CPC .... G06F 9/5077; G06F 9/45558; G06F 17/30; G06F 17/30194; G06F 17/30861; H04L 29/06; H04L 61/20; H04L 61/1511
See application file for complete search history.

(56) References Cited

U.S. PATENT DOCUMENTS 6,243,825 B1* 6/2001 Gamache ................ H04L 29/06
709/228
9,124,633 B1* 9/2015 Eizadi .................. G06F 16/2379
(Continued)

*Primary Examiner* — Kyung H Shin
(74) *Attorney, Agent, or Firm* — Hewlett Packard Enterprise Patent Department

(57) ABSTRACT

Systems, methods, and software described herein facilitate the management of virtual clusters in a large-scale processing environment. In one implementation, a method of operating a control node includes receiving a request to configure a virtual cluster with one or more data processing nodes, and identifying a tenant associated with the request. The method further provides identifying a namespace for the tenant, and identifying internet protocol (IP) addresses for the one or more data processing nodes. The method also includes generating namespace to IP address pairs for the one or more data processing nodes based on the namespace and the IP addresses, and configuring a domain name system (DNS) for the virtual cluster with the namespace to IP address pairs.

20 Claims, 10 Drawing Sheets

(51) Int. Cl.
*H04L 29/06* (2006.01)
*G06F 16/00* (2019.01)
*G06F 16/95* (2019.01)
*G06F 16/182* (2019.01)

(52) U.S. Cl.
CPC ............ *G06F 16/182* (2019.01); *G06F 16/95* (2019.01); *H04L 29/06* (2013.01); *H04L 61/1511* (2013.01); *H04L 61/20* (2013.01); *H04L 61/2061* (2013.01)

(56) References Cited

U.S. PATENT DOCUMENTS

| | | | |
|---|---|---|---|
| 2006/0041580 A1* | 2/2006 | Ozdemir | H04L 67/1097 |
| 2012/0117241 A1* | 5/2012 | Witt | H04L 67/00 |
| | | | 709/226 |
| 2014/0281032 A1* | 9/2014 | Roskind | H04L 61/1511 |
| | | | 709/245 |
| 2015/0113529 A1* | 4/2015 | Zhong | G06F 9/5077 |
| | | | 718/1 |

* cited by examiner

TENNANT Y DNS
381

| NAMESPACE 610 | IP ADDRESSES 620 |
|---|---|
| NAMESPACE TENANT Y (VN 333) | ADDRESS C |
| NAMESPACE TENANT Y (VN 334) | ADDRESS D |
| NAMESPACE TENANT Y (VN 335) | ADDRESS E |
| NAMESPACE TENANT Y (VN 332) | ADDRESS I |

FIGURE 6

GATEWAY CONFIGURATION
700

| VLANS 710 | IP ADDRESSES 720 |
|---|---|
| TENANT X TAG | ADDRESSES A-B |
| TENANT Y TAG | ADDRESSES C-E |
| TENANT Z TAG | ADDRESSES F-H |
| TENANT Y TAG | ADDRESS I |

FIGURE 7

MANAGEMENT OF DOMAIN NAME SYSTEMS IN A LARGE-SCALE PROCESSING ENVIRONMENT

RELATED APPLICATIONS

This application is a continuation of, and claims priority to, U.S. patent application Ser. No. 14/964,472, filed on Dec. 9, 2015, and entitled "Management of Domain Name Systems in a Large-Scale Processing Environment," which is hereby incorporated by reference in its entirety.

TECHNICAL FIELD

Aspects of the disclosure are related to computing hardware and software technology, and in particular to the management of virtual clusters in a large-scale processing environment.

TECHNICAL BACKGROUND

An increasing number of data-intensive distributed applications are being developed to serve various needs, such as processing very large data sets that generally cannot be handled by a single computer. Instead, clusters of computers are employed to distribute various tasks, such as organizing and accessing the data and performing related operations with respect to the data. Various applications and frameworks have been developed to interact with such large data sets, including Hive, HBase, Hadoop, Spark, Amazon S3, and CloudStore, among others.

At the same time, virtualization techniques have gained popularity and are now commonplace in data centers and other computing environments in which it is useful to increase the efficiency with which computing resources are used. In a virtualized environment, one or more virtual nodes are instantiated on an underlying host computer and share the resources of the underlying computer. Accordingly, rather than implementing a single node per host computing system, multiple nodes may be deployed on a host to more efficiently use the processing resources of the computing system. These virtual nodes may include full operating system virtual machines, Linux containers, such as Docker containers, jails, or other similar types of virtual containment nodes. However, although virtual nodes may more efficiently use the resources of the underlying host computing systems, difficulties often arise in scaling the virtual nodes to meet the requirements of multiple tenants that may share the resources of the host computing systems.

Overview

The technology disclosed herein enhances the scalability of a large-scale processing environment for multiple tenants. In one implementation, a method of operating a control node includes receiving a request to configure a virtual cluster with one or more data processing nodes, and identifying a tenant associated with the request. The method further provides identifying a namespace for the tenant, and identifying internet protocol (IP) addresses for the one or more data processing nodes. The method also includes generating namespace to IP address pairs for the one or more data processing nodes based on the namespace and the IP addresses, and configuring a domain name system (DNS) for the virtual cluster with the namespace to IP address pairs.

This Overview is provided to introduce a selection of concepts in a simplified form that are further described below in the Technical Disclosure. It should be understood that this Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 6 illustrates a domain name system configuration for a virtual cluster according to one implementation.

FIG. 7 illustrates a gateway configuration to manage virtual local area networks within a large-scale processing environment according to one implementation.

TECHNICAL DISCLOSURE

Figure 1:
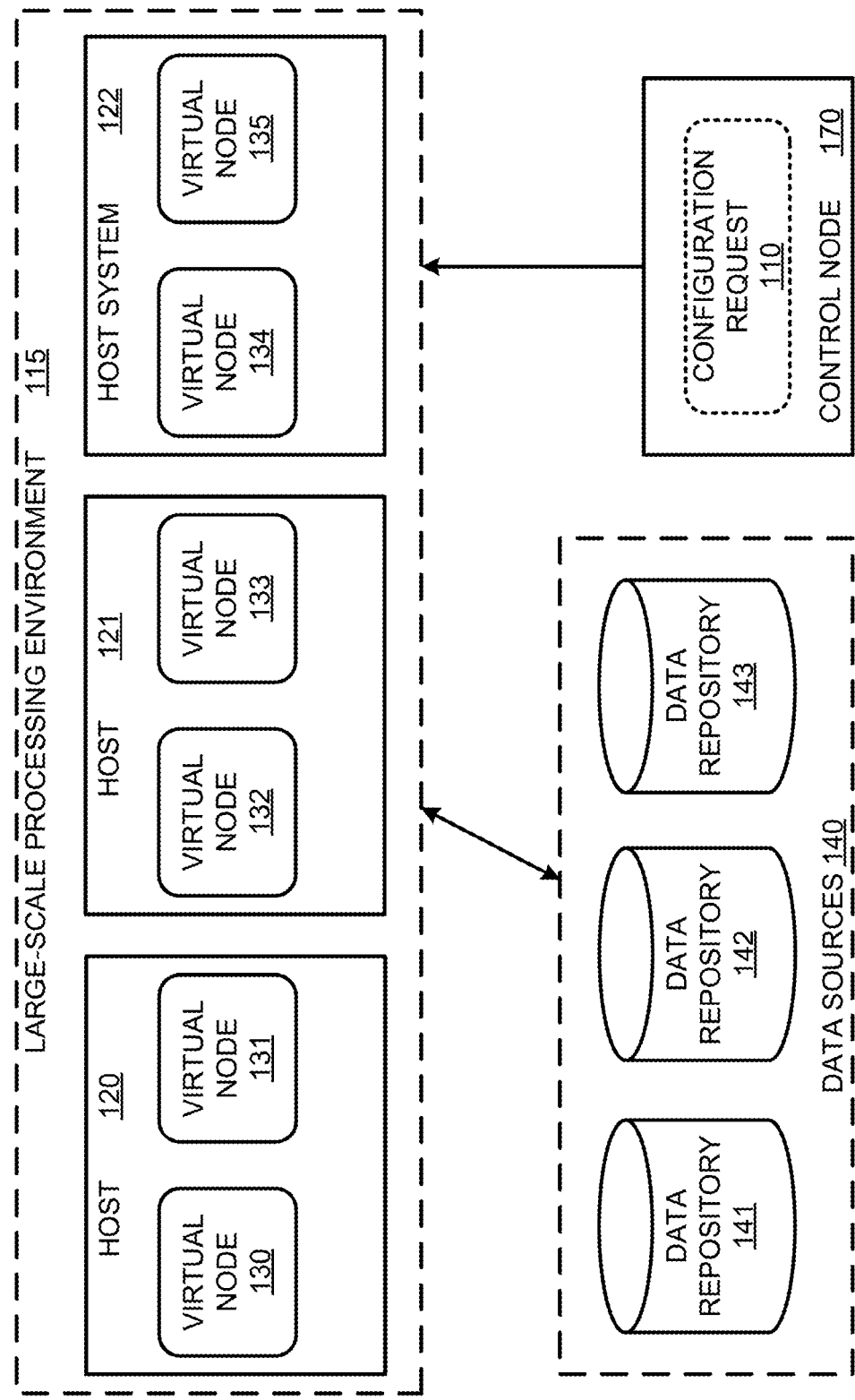
FIG. 1 illustrates a computing architecture to provide virtual data processing clusters to multiple tenants.

Large-scale processing environments (LSPEs) may employ a plurality of physical computing systems to provide efficient handling of job processes across a plurality of virtual data processing nodes. These virtual nodes may include full operating system virtual machines, Linux containers, such as Docker containers, jails, or other similar types of virtual containment nodes. In addition to the virtual processing nodes, data sources are made available to the virtual processing nodes that may be stored on the same physical computing systems or on separate physical computing systems and devices. These data sources may be stored using Hadoop distributed file system (HDFS), versions of the Google file system, versions of the Gluster file system (GlusterFS), or any other distributed file system version—including combinations thereof. Data sources may also be stored using object storage systems such as Swift.

To assign job processes, such as Apache Hadoop processes, Apache Spark processes, Disco processes, or other similar job processes to the host computing systems within a LSPE, a control node may be maintained that can distribute jobs within the environment for multiple tenants. A tenant may include, but is not limited to, a company using the LSPE, a division of a company using the LSPE, or some other defined user of the LSPE. In some implementations, the tenants associated with the LSPE may be associated with a predefined range or set of internet protocol (IP) addresses.

This set of IP addresses may be dynamically allocated to the processing nodes, as the nodes are required for processing jobs within the environment. For example, a first set of virtual nodes may initially be allocated with a first set of IP addresses, and a subsequent set of virtual nodes may be allocated with a second set of IP addresses.

In some implementations, it may be desired to maintain security and separation between each of the tenants of the processing environment. Accordingly, it may be desirable to prevent a first tenant from accessing or viewing the data that is being processed by another tenant within the environment. To prevent improper access within the environment, each of the tenants may be associated with a defined virtual local area network (VLAN), which can be used to separate processing nodes of each tenant from other nodes that are operating within the environment. A VLAN allows the nodes for the individual tenant to identify and communicate with other nodes on the same network, but prevents access to other nodes that are not incorporated in the virtual network. In particular, to implement multiple VLANs, the LSPE may allocate VLAN tags, wherein each VLAN tag is associated with an individual tenant. The VLAN tags are used by the processing nodes by placing the VLAN tag within a header for data packets that can be used by gateways, both real and virtual, to direct the communications to other nodes associated with the same tag. In one example, an administrator of a first tenant may generate a request to configure a virtual cluster with three processing nodes. In response to the request, the control node may identify a VLAN associated with the tenant, and generate VLAN tag to IP address pairs for the three processing nodes of the cluster. Once the pairs are generated, the pairs may be communicated to the processing environment, permitting the cluster of three nodes to execute on one or more of the host computing systems.

In some implementations, the control node may be configured to initiate the virtual nodes within the LSPE, and configure the nodes based on the IP address to VLAN tag pairs. Once initiated, and the nodes join the appropriate virtual network, the requested job process may be initiated on the cluster. In other implementations, rather than initiating new virtual nodes, the cluster may be allocated to idle or unused virtual nodes. In particular, once a new node is identified to support the request for the processing cluster, the control node may identify the required idle virtual nodes, and communicate the VLAN and IP address configuration to the virtual nodes allowing the nodes to join the appropriate cluster. Once the nodes are initiated and configured with the appropriate VLAN and IP addresses, the cluster may execute the desired job process.

To further demonstrate the operation of the control node in a LSPE, FIG. 1 is provided. FIG. 1 illustrates a computing architecture 100 to provide virtual data processing clusters to multiple tenants. Computing architecture 100 includes LSPE 115, data sources 140, and control node 170. LSPE 115 includes hosts 120-122, which further comprise virtual nodes 130-135 capable of executing a data processing framework, such as Apache Hadoop, Apache Spark, or some other similar large-scale data processing framework. Data sources 140 further includes data repositories 141-143, which may include data stored using versions of HDFS, versions of the Google file system, versions of the GlusterFS, or any other distributed file system version—including combinations thereof.

In operation, virtual nodes 130-135, which may include full operating system virtual machines, Linux containers, jails, or some other virtual containment nodes, including combinations thereof, are initiated within LSPE 115 to execute various large-scale processing jobs. These nodes may be configured as one or more clusters that, together, perform distributed operations on the data stored in data repositories 141-143. These operations may include reading from and writing to the storage media associated with a particular large data set for a job process.

In the present example, virtual nodes 130-135 may be allocated to clusters for multiple tenants of LSPE 115. These tenants may include, but are not limited to, different corporations and companies, divisions within the corporations or companies, or any other similar tenant that may share the physical resources of the host computing systems. Here, rather than allocating IP addresses and virtual nodes to each of the tenants in a static manner, control node 170 is provided that can be used to dynamically provide the virtual node resources for each of the tenants. In some implementations, LSPE 115 may be allocated a predefined range of IP addresses that can be provided to any of the virtual nodes upon request to configure a virtual cluster. For example, a marketing tenant for a corporation may request a cluster of three virtual nodes and be provided with three IP addresses for the three virtual nodes. After the marketing request, a legal tenant for the corporation may request a cluster of two virtual nodes and be provided with two different IP addresses for the two virtual nodes. In addition to providing each of the clusters with unique IP addresses, control node 170 further segregates each of the virtual clusters into VLANs that can prevent each of the clusters from identifying data and communications from other tenants within the environment. VLANs may include real and virtual gateways, such as switches, that can be used to identify and create a network for the processing nodes of the environment. These groupings, or partitions create individual broadcast domains, which are mutually isolated so that packets can only pass between nodes and the at least one real or virtual gateway. Referring to the example above, a VLAN may be configured for the marketing department while a second VLAN may be configured for the legal department. Accordingly, the virtual nodes for each of the departments may not recognize or identify the other nodes for the other departments and tenants.

Figure 2:
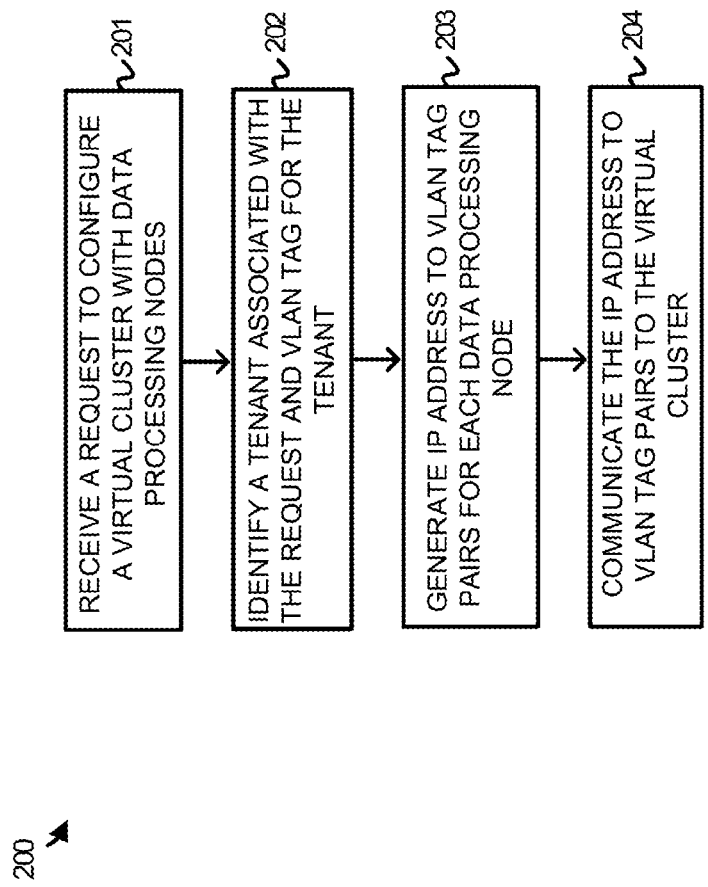
FIG. 2 illustrates a method of operating a control node to configure data processing clusters for multiple tenants.

Referring now to FIG. 2, FIG. 2 illustrates a method 200 of operating control node 170 to configure data processing clusters for multiple tenants. The operations of FIG. 2 are referenced parenthetically in the description below.

As described herein, LSPE 115 includes the processing hardware to execute virtual nodes that, together, can perform large-scale data operations on data from data repositories 141-143. To allocate the virtual nodes within the environment, control node 170 is provided, which may comprise a virtual or real processing node capable of communicating with hosts 120-122. In operation, control node 170 receives a request to configure a virtual cluster with data processing nodes (201). This request may be received locally at control node 170, may be received from an administration console external to control node 170, may be generated by an automated process, or may be generated in any other similar manner. The request may comprise a new cluster request to generate a new processing cluster, or may comprise a modify request that can be used to add at least one processing node to an existing cluster. In response to the request, control node 170 identifies a tenant associated with the request and a VLAN or VLAN tag corresponding to the tenant (202).

In some implementations, LSPE 115 may provide processing resources to multiple tenants, which may include companies, divisions with companies, or some other similar division. Because the data processed for each of the tenants may be sensitive, it may be undesirable for other tenants within the network to identify, access, or otherwise manage the data that is being accessed by other tenants within the same environment. Accordingly, control node 170 may provide VLAN tags that can be used to associate specific virtual processing nodes to the individual tenants, wherein the VLAN tags can be used by real and virtual gateways to identify packets for the various tenants. For example, a first tenant may be associated with a first VLAN and VLAN tag that can be used to group the required processing nodes, and a second tenant may be associated with a second VLAN and VLAN tag that can be used to group a second set of processing nodes.

Once the tenant and VLAN is identified for the request, control node 170 generates IP address to VLAN tag pairs for each data processing node for the requested cluster (203). In some implementations, the control node may be allocated a set of IP addresses that can be dynamically provided to new clusters. Accordingly, rather than providing static IP addresses to processing nodes that may be idle or be unused for a period of time, the addresses may only be assigned at the time of a request for a cluster and a job process. Once the IP address to VLAN tag pairs are generated, control node 170 communicates the IP address to VLAN tag pairs to LSPE 115 and the appropriate cluster (204). In some implementations, new virtual nodes may be required to support the request. As a result, the nodes may be initiated on one or more of hosts 120-122 before the job process can be initiated in the cluster. In some implementations, to communicate the IP address to VLAN pairs to the processing environment may include configuring the required nodes and any gateways or switches to identify the IP addresses and VLANs required in implementing the desired configuration. This configuration may include providing the individual nodes with the identified IP address and notifying any real or virtual gateway of the VLAN configuration for the new cluster.

Referring to the example in FIG. 1, configuration request 110 may be received to generate a processing cluster of three virtual nodes. In response to the request, control node 170 may identify a VLAN associated with the request, and generate IP address to VLAN tag pairs for each of the processing nodes that will belong in the cluster. Once the pairs are determined, the pairs may be communicated to LSPE 115, allowing the environment to implement the desired cluster. For example, if virtual nodes 130-132 were identified for the new cluster, each of the nodes may be configured with an available IP address from a range of IP addresses available to control node 170. Further, switches or other similar gateways, both real and virtual, may be provided with configuration information for the VLAN, including the IP addresses that are included in the cluster, possible host information for each of the nodes in the cluster, VLAN tag information for the IP addresses, or any other similar VLAN information. Once configured, virtual nodes 130-132 may communicate as a private network despite being located on different host computing systems.

In some implementations, to permit the processing nodes to communicate, the processing nodes may be associated with a domain name system (DNS) that can be used to manage the IP addresses for a particular tenant. A DNS allows the nodes in the virtual cluster to maintain a namespace for other nodes of the same cluster, without storing IP addresses and other location information for the co-executing nodes. Accordingly, nodes may be configured with an arbitrary namespace and use the DNS to provide the dynamic addressing information for the cluster. For example, if virtual node 130 and virtual node 132 were in the same processing cluster, the nodes may query the DNS server to determine the IP address of the opposite node. Once determined, information may be exchanged between the nodes. By implementing a DNS server, which may be located as a separate node on hosts 120-122, implemented as a part of control node 170, or implemented in any other node, virtual clusters may identify the IP address location of dynamically allocated nodes that are operating in the same cluster.

In some examples, once a virtual cluster is configured for a tenant, it may be desirable to reduce the amount of resources that are provided to the cluster. As a result, a request may be generated to remove at least one of the virtual processing nodes for the cluster. This request may comprise a request to reduce the size of the cluster, or may comprise a request to remove all of the nodes from the cluster. The request may be generated by a user associated with the particular tenant, may be generated by an administrator of the LSPE, or may be generated in by any other person or process. In response to a request to remove processing nodes, the control node may identify one or more IP address to VLAN tag pairs that correspond to the processing nodes, and communicate a command to the LSPE that directs the LSPE to remove the one or more IP address to VLAN tag pairs that correspond to the processing nodes. In some implementations, to remove the pairs, the control node may command gateways of the LSPE to remove the appropriate VLAN pairs, remove the namespace to IP address pairs for the identified nodes in the DNS, and may further stop execution or put in an idle state the corresponding processing nodes. Once the processing nodes are removed from the virtual cluster, IP addresses that were associated with the removed nodes may be allocated to alternative virtual clusters by the control node.

Figure 3:
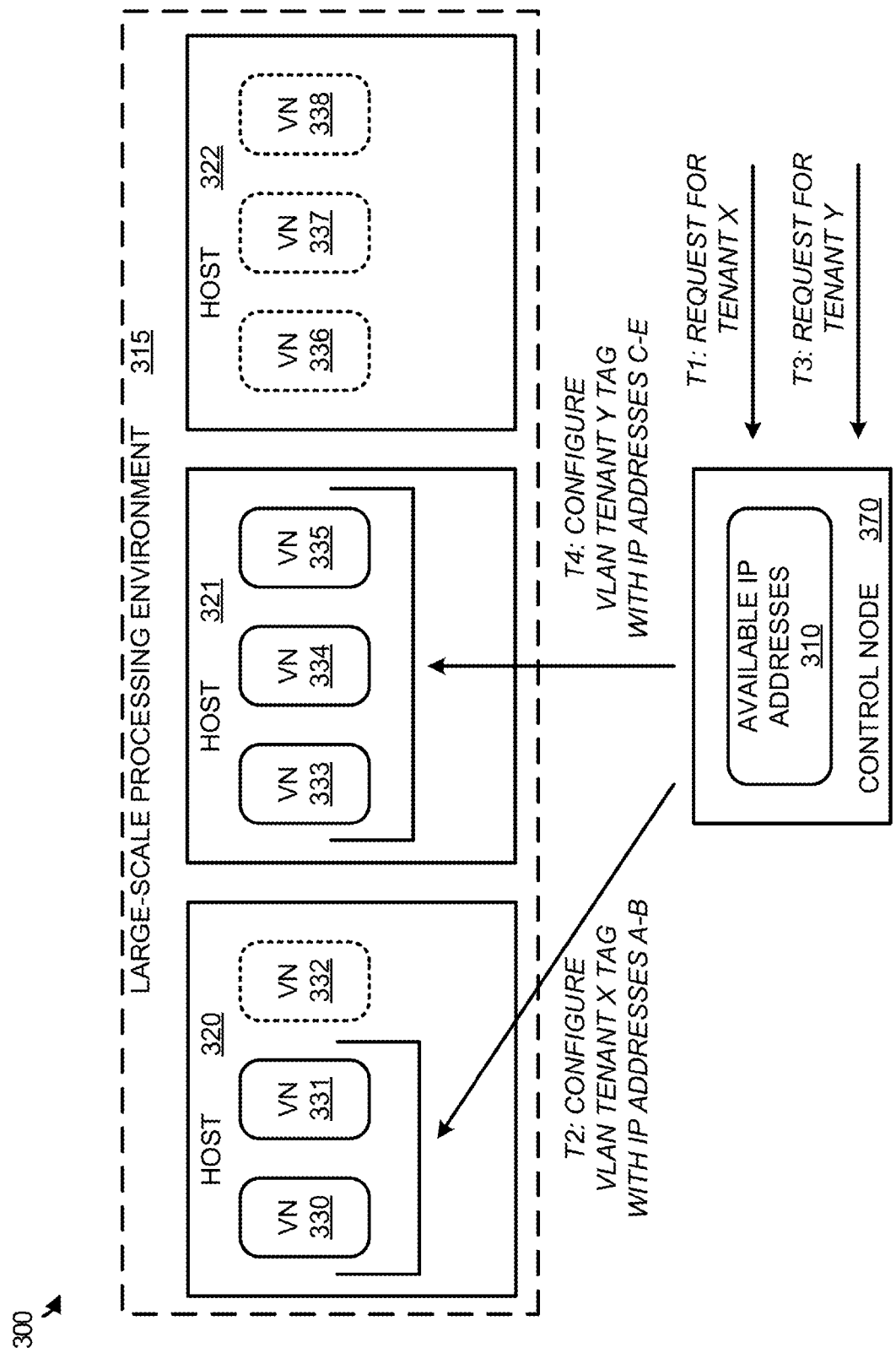
FIG. 3 illustrates an operational scenario of configuring data processing clusters for multiple tenants.

Referring now to FIG. 3, FIG. 3 illustrates an operational scenario 300 of configuring data processing clusters for multiple tenants. Operational scenario 300 includes LSPE 315 and control node 370. LSPE 315 further includes hosts 320-322, which are used to execute virtual nodes (VNs) 330-338. Control node 370 is allocated available IP addresses 310, which correspond to a range of IP addresses that can be dynamically allocated to virtual nodes as they are needed for processing clusters.

At time T1, a request is generated for tenant X to generate a new processing cluster in LSPE 315. This new cluster may comprise an Apache Hadoop cluster, an Apache Spark cluster, or any other similar cluster capable of processing large data sets and processing jobs. In response to the request, control node 370 identifies a VLAN associated with tenant X and at time T2 configures the VLAN cluster for tenant X in LSPE 315. In the present example, to configure the cluster for tenant X, control node 370 identifies available IP addresses that can be allocated to the virtual nodes, and generates VLAN tag to IP address pairs for each of the nodes required in the cluster. This pairing indicates that VNs 330-331 should be allocated IP address A and B from the available set of IP addresses. Once the pairs are allocated and communicated to the nodes and gateways of LSPE 315, VNs 330-331 may initiate processing of the appropriate job process. In some implementations, VNs 330-331 may be initiated by control node 370 in response to the cluster request, however, in other examples, control node 370 may allocate the job process to idle or otherwise available nodes within the processing environment.

After configuring the tenant X cluster, control node 370, at time T3, receives a request to configure a cluster for tenant Y. Similar to the operations described above with respect to tenant X, control node 370 identifies a VLAN and VLAN tag for the cluster based on the identity of the tenant. In particular, because tenant Y is different than tenant X, control node 370 would require that the nodes for the tenant Y operate in a separate virtual network than the processing nodes for tenant X. In addition to identifying the VLAN for the tenant, control node 370 further identifies the appropriate nodes that are capable of providing the cluster configuration in the request. These nodes may be nodes that are idle within LSPE 315, may be nodes that can be initiated on a host within LSPE 315, or may be any other node that can be made available to the processing cluster. Here, control node 370 identifies VNs 333-335 on host 321 to accommodate the configuration request. Once the nodes and VLAN are identified for the cluster, control node 370 determines IP addresses that can be assigned to the individual nodes from available IP addresses 310. As described herein, a processing environment may be provided with a set of available IP addresses 310 that can be dynamically provided to clusters as required. Because the cluster for tenant X was previously allocated IP addresses A and B, control node 370 identifies that IP addresses C, D, and E should be allocated to VNs 333-335 and pairs the addresses to the VLAN tag for tenant Y. Once the IP address to VLAN tag pairs are generated for the new cluster, the pairs are then communicated to LSPE 315 to be implemented in the nodes at time T4. After allocation, VNs 333-335 may execute the desired job process for tenant Y.

By providing individual VLANs for each of the tenants, processing nodes may be allocated across various hosts within the environment, while preventing tenants from identifying other co-executing nodes within the system. Accordingly, VNs 330-331 for tenant X will execute independently of VNs 333-335 for tenant Y.

Figure 4:
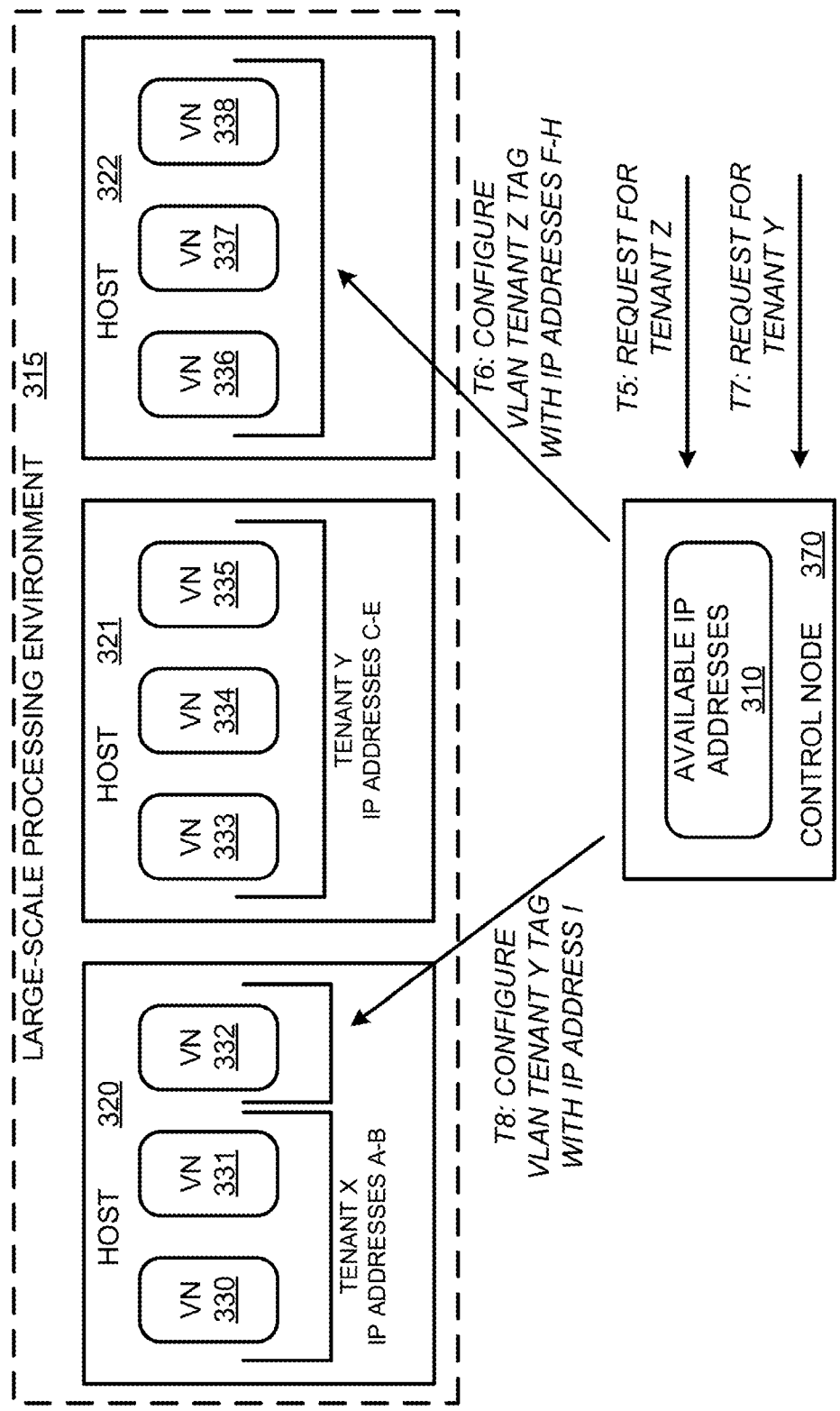
FIG. 4 illustrates an operational scenario of configuring data processing clusters for multiple tenants.

Turning to FIG. 4, FIG. 4 illustrates an operational scenario 400 of configuring data processing clusters for multiple tenants. Operational scenario 400 is a continuation of operational scenario 300 for configuring processing clusters within LSPE 315.

As depicted in FIG. 4, at time T5 control node 370 receives a request from tenant Z to generate a new virtual cluster. In response to the request, control node 370 identifies VNs 336-338 to support the request, and identifies a VLAN associated with tenant Z. Once the VLAN is identified, control node 370 generates VLAN tag to IP address pairs for the new processing cluster. Here, because the IP addresses A-E had been allocated to tenants X and Y, control node 370 allocates the next available IP addresses to VNs 336-338, which comprise IP addresses F-H. Once the pairs are generated, control node 370 configures the virtual cluster at time T6, by communicating the address pairs to LSPE 315. In some implementations, VNs 336-338 may be initiated on host 322 in response to a request from control node 370, however, in other implementations, control node 370 may allocate the cluster to VNs 336-338 that are idle and not allocated to any other virtual processing cluster. Once the nodes are selected, control node 370 may configure each of the nodes with an IP address from IP addresses F-H. Further, gateways, both real and virtual, within LSPE 315 may be configured to associate the allocated IP addresses to the VLAN tag for tenant Z. Consequently, rather than identifying all of the virtual nodes within the network, the cluster may only identify other virtual nodes that belong to cluster for tenant Z.

In addition to provisioning the new virtual cluster for tenant Z, FIG. 4 further depicts receiving, at time T7, a configuration request for tenant Y. In particular, the request for tenant Y includes a request to add a new virtual node to the cluster for tenant Y. In response to the request, control node 370 identifies a VN from VNs 330-338 capable of supporting the request, and identifies a VLAN associated with tenant Y. Once the VLAN is identified, control node 370 selects an IP address for the new virtual node from available IP addresses 310. Using the identified VLAN and IP address, control node 370 generates a VLAN tag to IP address pair for the new node and communicates the pairing to LSPE 315. Here, VN 332 is identified or generated to support the cluster configuration request, and is provided IP address I, allowing the VN 332 to join the VLAN consisting of VNs 333-335. In addition to providing the IP address to VN 332, control node 370 may further modify switch and other network configurations to implement the desired VLAN. Accordingly, gateways may add VN 332 to the VLAN supporting VNs 333-335, allowing the nodes to communicate on a private network even though the nodes execute on separate host computing systems.

In some implementations, the clusters that are generated within LSPE 315 may comprise temporary clusters, that are implemented only as long as necessary to complete a desired job process. As a result of this configuration, as jobs are completed, the clusters may be removed from the processing environment, allowing the IP addresses and the processing resources to be allocated to new clusters. For example, if the cluster for tenant X completed the desired job process, control node 370 may suspend or remove VNs 330-331 on host 320, and prepare IP addresses A and B to be allocated to new data processing clusters.

Figure 5:
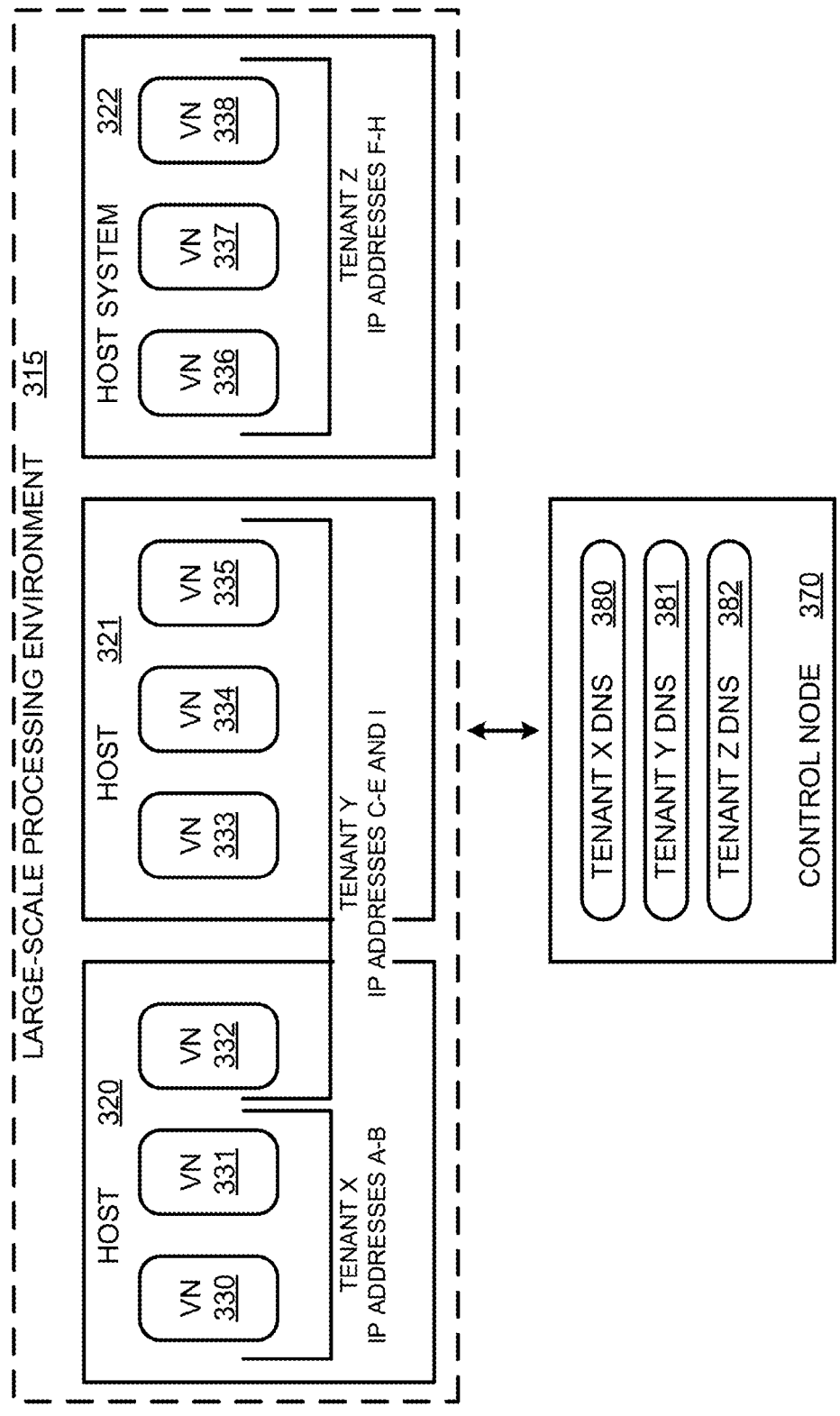
FIG. 5 illustrates a computing architecture to provide domain name system services to virtual nodes with multiple tenants.

Referring now to FIG. 5, FIG. 5 illustrates a computing architecture 500 to provide domain name system services to virtual nodes with multiple tenants. Computing architecture 500 includes the operational elements of FIGS. 3-4, and further includes DNSs 380-382, which are used to direct communications between the various processing nodes within LSPE 315.

As described in FIGS. 3-4 control node 370 may allocate IP addresses to processing clusters, along with an appropriate VLAN configuration for each of the virtual clusters. To allow the individual VNs for each of the clusters to communicate, control node 370 manages tenant DNSs 380-382 for each of the tenants of LSPE 315. DNSs 380-382 allow the nodes in each of the clusters to query and identify the address of other nodes in the same cluster. For example, tenant Y DNS 381 may be used by VNs 332-335 to identify the locations and addresses of the other nodes within the same cluster. Accordingly, if VN 332 required a communication with VN 333, VN 332 may query tenant Y DNS 381, using an IP address or some other address format understood by the DNS, to determine the address of VN 333. Once the address is retrieved, VN 332 may make the required communication with VN 333.

In some examples, each of the tenants may be assigned a namespace that could be used to address the other nodes within the same tenant cluster. In one implementation, the control node may be configured to receive a request to configure a virtual cluster with one or more data processing nodes, and identify a tenant associated with the request. The control node may further be configured to identify a namespace for the tenant, and identify IP addresses for the one or more data processing nodes. Once identified, the control node generates namespace to IP address pairs for the one or more data processing nodes based on the namespace and the IP addresses, and configures a DNS for the virtual cluster with the namespace to IP address pairs.

For instance, referring to tenant X as an example, a request may be generated to produce a cluster with CNs 330-331 for tenant X. In response to the request, control node 370 identifies IP addresses that can be provided to the VNs, and further determines a namespace associated with tenant X. This namespace may be any arbitrary name, such as TENANT_X.local, any set of letters, numbers, or symbols, or other similar namespace. Once the IP addresses and namespace are identified, control node 370 generates IP address to namespace pairs for the individual nodes of the cluster based on the allocated IP addresses and namespace. In particular, these pairs generate namespace identifiers for the individual nodes, such as "TENANT_X/NODE330" for VN 330, and match the namespace identifiers to the IP addresses for the particular node. Once generated, the pairs may then be used to configure tenant X DNS 380. Additionally, in some examples, each node may be configured with the namespace identifiers for every other node in the cluster, allowing the nodes to query the DNS for the appropriate address information.

In some implementations, each of the processing nodes may be configured or provided with the IP address for the appropriate tenant DNS. Accordingly, rather than storing the IP addresses for the individual nodes of the processing cluster, the nodes may use the IP address of the tenant DNS to translate a namespace identifier for a cluster node into the required IP address information for the cluster node. Although illustrated as co-located on control node 370, it should be understood that the DNS for each of the tenants may be located on a separate real or virtual DNS node. In some implementations, the DNS nodes may share the hosts with the virtual nodes in large-scale processing system 315, however, in other implementations, the DNS nodes may reside on separate computing systems in the computing architecture.

In some examples, in addition to initially configuring a DNS for a tenant cluster, requests may also be generated to modify the cluster. These modification requests may include adding one or more additional nodes to a preexisting cluster, removing one or more of the nodes from the preexisting cluster, or any other similar modification to a cluster. In response to an add node request, the control node may generate one or more namespace to IP address pairs for the tenant cluster, and configure the processing environment with the new pairs. In contrast, if a remove node request was received, the control node may identify one or more namespace to IP address pairs that correspond to the nodes to be removed. Once the pairs are identified, the control node will remove the identified pairs from the DNS for the tenant cluster. Additionally, in some implementations, the control node may also cease the execution of the processing node, place the node in an idle state, or otherwise limit the operation of the processing node within the processing environment.

In some implementations, in addition to being accessible by each of the nodes within a tenant's cluster, it should be understood that the DNS may also be accessible to control or management nodes for the particular tenant. These control or management nodes may allow administrators associated with the tenant to monitor operations on each of the data processing nodes that belong to their cluster. For example, referring to FIG. 5, VNs 330-331 may each have access to tenant X DNS 380 using credentials associated with the particular tenant, and any administrator or user associated with tenant X may also communicate with tenant X DNS 380 to determine IP addresses for nodes within the cluster.

However, VNs 332-338 and any administrators or users associated with the tenant Y and tenant Z would be unable to request IP addresses from tenant X DNS 380. To ensure that only approved virtual nodes and administrators associated with the virtual nodes can communicate with the DNS, credentials, such as usernames, passwords, keys, or any other similar security credential may be applied. Accordingly, referring to the example of tenant X, VNs 330-331 and administrators associated with the cluster may be supplied with credentials and permissions for communicating with tenant X DNS 380, while administrators and nodes for other tenants without the appropriate credentials would be incapable of determining IP addresses from tenant X DNS 380.

In some implementations, in addition to administrators of the processing cluster, application programming interface (API) clients may also require access to the processing nodes to manage, monitor, and visualize the large-scale processing operations. Consequently, although the API clients reside on physical or virtual hosts outside of the LSPE, the clients may require access permissions to communicate with services of the processing nodes. For instance, in the example of tenant X, the API clients may require permissions and addressing information to communicate with tenant X DNS 380 to determine IP addresses for the processing nodes associated with tenant X.

FIG. 6 illustrates a DNS configuration for a virtual cluster according to one implementation. FIG. 6 is an example of tenant Y DNS 381 from FIG. 5, wherein the DNS provides IP address information to the processing cluster for tenant Y. In the present example, tenant Y DNS 381 includes namespace 610 and IP addresses 620. Namespace 610 is used internally within the cluster to address the different nodes of the cluster. Thus, rather than configuring the nodes with the IP addresses, the nodes may be configured with an arbitrary namespace and individual node identifiers that can be translated to the required IP addresses by the DNS.

In operation, a control node for a LSPE receives requests to generate or modify clusters within the processing environment. In response to the requests, processing nodes are identified to support the request and are configured with the appropriate network settings for the cluster. These settings may include VLAN settings, IP address settings, and any other similar network setting that can be used to configure the cluster. As described in FIG. 5, a DNS may also be configured that pairs namespace identifiers for each node in the cluster to the IP addresses for each node in the cluster. Accordingly, because tenant Y was allocated VNs 332-335, namespace identifiers are allocated for each of the nodes associated with tenant Y, wherein the namespace identifiers are associated with the IP addresses for the individual nodes. For example, namespace identifiers for a marketing department tenant may include an overarching identifier of MARKETING along with arbitrary identifiers for the individual nodes. By providing tenant Y DNS 381 with the appropriate namespace identifier, the nodes may communicate with one another independently of the allocated IP addresses. Thus, even if the cluster were stopped and reinitiated within the environment, the cluster may be allocated new IP addresses to support any new job processes, while maintaining the original namespace of the cluster.

In some implementations, credentials, such as usernames, passwords, and security keys may be used to limit the access to tenant Y DNS 381. For example, VNs 332-335 and any administration system for the tenant Y cluster may be supplied with the credentials to access tenant Y DNS 381, while other tenant virtual nodes and administrations systems would not be supplied with the same credentials. Accordingly, a virtual node or administration system that does not belong to tenant Y would be incapable of determining IP addresses allocated to the cluster of tenant Y.

In some examples, in addition to administration systems, large-scale processing nodes may further include services that communicate with API clients that are external from the processing cluster. These clients may provide management, monitoring, and visualization operations for the data processing that occurs within the LSPE. Because the API clients reside outside of the processing cluster, in some implementations, permissions and credentials may be provided to the API clients by a control node, permitting the clients to access the required DNS to resolve IP address queries.

Turning to FIG. 7, FIG. 7 illustrates a gateway configuration 700 to manage the VLANs within LSPE 300. Gateway configuration 700 includes VLANs 710 and IP addresses 720. VLANs 710 include the VLAN tags for tenants that operate clusters within LSPE 710, wherein the VLAN tags are used by switches and other gateways in the environment to identify communications for each particular VLAN. In particular, the VLAN tag may be implemented within the Ethernet protocol to identify which network a communication belongs.

Referring back to FIG. 5, FIG. 5 illustrates the allocation of multiple tenants across hosts 320-322. These tenants are each provided two or more nodes that, together, form a cluster for the associated tenant to process data stored in one or more storage repositories. To manage the communications interactions between the various tenants, control node 370 may implement VLANs for each of the tenants to segregate the various clusters. In particular, control node 370 may provide a VLAN that is specific to the cluster for tenant X, a VLAN that is specific to tenant Y, and a VLAN that is specific to tenant Z.

To provide the VLAN functionality, switches and gateways, both real and virtual, may be provided with a gateway configuration similar to gateway configuration 700. Gateway configuration 700 provides tags for each of the VLANs that can be used in identifying communications from each of the nodes within the processing environment. Rather than providing a single network to all of the tenants, allowing the tenants to identify nodes for other tenants, the gateways may segregate the tenant clusters based on the tags, permitting the tenant nodes to communicate in isolation from the other tenants in the environment. For example, the VLAN tag for tenant X may be used to permit IP addresses A and B to communicate, wherein IP addresses A and B are associated with VNs 330-331. Accordingly, rather than forming a network of all VNs 330-338, smaller networks associated with the individual tenants may be generated that prevent the tenants from identifying and sharing data.

Figure 8:
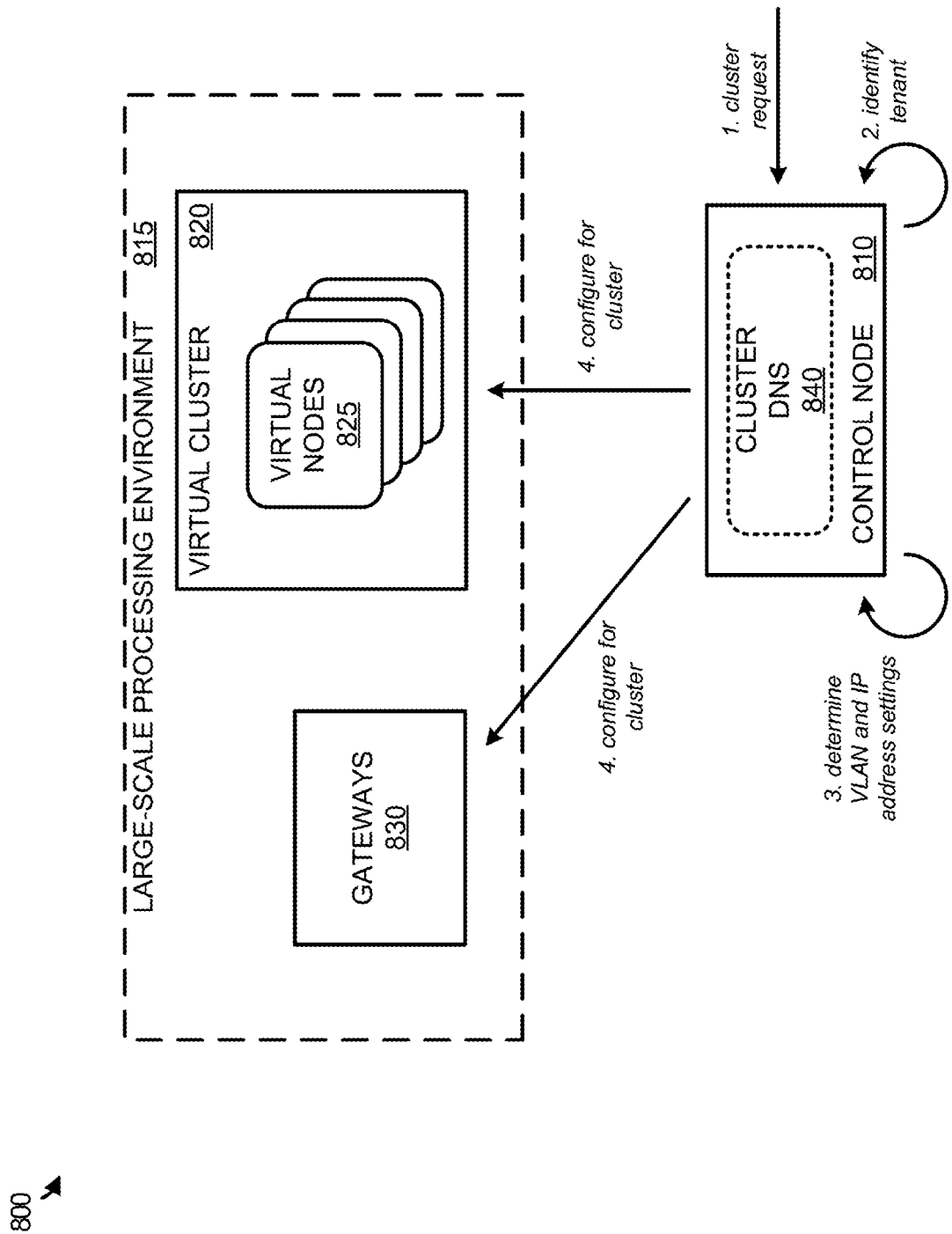
FIG. 8 illustrates an operational scenario of configuring a virtual processing cluster for a tenant according to one implementation.

Turning to FIG. 8, FIG. 8 illustrates an operational scenario 800 of configuring a virtual processing cluster for a tenant according to one implementation. Operational scenario 800 includes control node, LSPE 815. LSPE 815 further includes virtual cluster 820, and gateways 830. Control node 810 further includes cluster DNS 840.

In operation, control node 810 receives a request to configure a cluster within LSPE 815. This request may be made locally at control node 810, may be received from an external administration console, may be generated by an automated process, or may be generated in any other manner. In response to receiving the request, control node 810 identifies a tenant associated with the request, wherein the tenant may comprise a division within an organization, such as a marketing or legal department, may comprise the organization itself, such as the corporation or partnership, or may comprise any other similar tenant that would share processing resources. Upon determination of the tenant, control node 810 determines VLAN and IP address settings capable of providing the cluster configuration.

As described herein, various tenants may share the processing resources of LSPE 815. As a result, it may be desired to segregate the clusters for each of the tenants to prevent tenants from accessing processing nodes and data that correspond to other tenants. In the present example, to assist in providing secure clusters for the tenants of LSPE 815, control node 810 may generate VLANs that associate the processing nodes for each tenant. In particular, referring to operational scenario 800, a VLAN may be generated that associates virtual nodes 825 into single virtual network. This virtual network may span across a single physical host computing system with multiple virtual nodes, or may span across multiple physical host computing systems capable of supporting the virtual nodes.

To provide the VLAN for virtual cluster 820 and virtual nodes 825, control node 810 may generate IP address to VLAN tag pairs for the various nodes within the cluster. A VLAN tag is a phrase included within a communication protocol that allows gateways, both real and virtual, to identify the VLAN to which the communication belongs. These VLAN tags may then be associated with the IP addresses that are allocated to virtual nodes 825, allowing gateways 830 to define the elements that comprise the virtual network. Once defined, virtual nodes 825 may operate in a network that is separate from other processing clusters within LSPE 815.

In addition to defining the VLAN for the request, control node 810 may further configure cluster DNS 840, which is used to provide DNS services to virtual cluster 820. In particular, the tenant that is requesting the virtual cluster may be associated with an arbitrary namespace that allows the processing nodes of the cluster to address communications to one another, independent of the IP addresses allocated to the nodes. For example, a marketing tenant may be provided with an arbitrary namespace for the virtual nodes within its cluster, allowing the nodes to address each other without identifying the IP addresses for the individual nodes. To determine the location of the individual nodes, the nodes may query cluster DNS 840, which maintains a lookup table or other similar data structure that can be used to match the namespace of the desired node to an IP address of the desired node. Once the IP address is determined the IP address is transferred to the requesting node, allowing the node to directly communicate with the other node in the cluster.

In some implementations, a set or range of IP addresses may be provided to control node 810, which can be dynamically allocated to clusters as they are required by the various tenants. Using the example of FIG. 8, in response to the cluster request for the particular tenant, control node 810 may identify a subset of the available IP addresses and provide the subset of IP addresses to the nodes of virtual cluster 820. Virtual cluster 820 may then use the IP addresses as required to complete the job process and, upon completion, surrender the IP addresses back to the pool of available IP addresses on control node 810. To surrender the IP addresses, the nodes in virtual cluster 820 may stop execution upon completion of the job process, allowing the IP addresses to be reallocated by control node 810. In other implementations, virtual nodes 825 may transition into an idle state, allowing control node 810 to revoke the IP addresses allocated to virtual cluster 820, and provide the IP addresses to new clusters initiated within LSPE 815.

Although, the nodes may surrender a subset of IP addresses when a job process is complete, the namespace and VLAN tag associated with the cluster may be maintained. As a result, if the cluster were initiated for another job process, the nodes may be allocated new IP addresses from the set of available IP addresses on control node 810, and the job processes may be accomplished using the new IP addresses. To provide this functionality, control node 810 may modify cluster DNS 840 based on the current set of IP addresses provided to the cluster. Accordingly, rather than modifying the way in which the virtual nodes interact, the nodes may query cluster DNS 840 to determine the current address for other nodes within the cluster.

Figure 9:
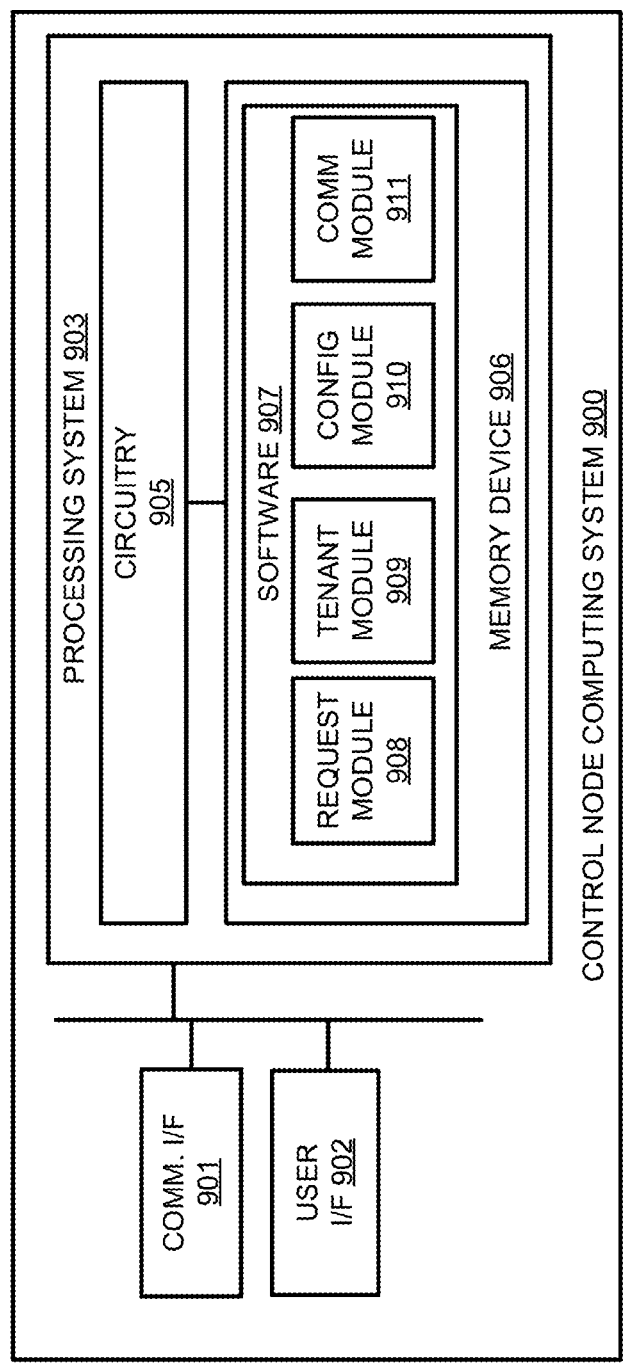
FIG. 9 illustrates a control node computing system capable of managing virtual nodes in a large-scale processing environment according to one implementation.

FIG. 9 illustrates a control node computing system 900 capable of managing virtual nodes in a LSPE according to one implementation. Control node computing system 900 is representative of any computing system or systems with which the various operational architectures, processes, scenarios, and sequences disclosed herein for a LSPE control node may be implemented. Control node computing system 900 is an example of control nodes 170, 310, and 810, although other examples may exist. Control node computing system 900 comprises communication interface 901, user interface 902, and processing system 903. Processing system 903 is linked to communication interface 901 and user interface 902. Processing system 903 includes processing circuitry 905 and memory device 906 that stores operating software 907. Administration computing system 900 may include other well-known components such as a battery and enclosure that are not shown for clarity. Computing system 900 may be a personal computer, server, or some other computing apparatus.

Communication interface 901 comprises components that communicate over communication links, such as network cards, ports, radio frequency (RF) transceivers, processing circuitry and software, or some other communication devices. Communication interface 901 may be configured to communicate over metallic, wireless, or optical links. Communication interface 901 may be configured to use Time Division Multiplex (TDM), Internet Protocol (IP), Ethernet, optical networking, wireless protocols, communication signaling, or some other communication format—including combinations thereof. In some implementations, communication interface 901 may be configured to communicate with host computing systems in a LSPE, wherein the host computing systems provide a platform for virtual data processing nodes and clusters.

User interface 902 comprises components that interact with a user to receive user inputs and to present media and/or information. User interface 902 may include a speaker, microphone, buttons, lights, display screen, touch screen, touch pad, scroll wheel, communication port, or some other user input/output apparatus—including combinations thereof. User interface 902 may be omitted in some examples.

Processing circuitry 905 comprises microprocessor and other circuitry that retrieves and executes operating software 907 from memory device 906. Memory device 906 comprises a non-transitory storage medium, such as a disk drive, flash drive, data storage circuitry, or some other memory apparatus. Processing circuitry 905 is typically mounted on a circuit board that may also hold memory device 906 and portions of communication interface 901 and user interface 902. Operating software 907 comprises computer programs, firmware, or some other form of machine-readable processing instructions. Operating software 907 includes request module 908, tenant module 909, configuration (config) module 910, and communication (comm) module 911, although any number of software modules may provide the same operation. Operating software 907 may further include an operating system, utilities, drivers, network interfaces, applications, or some other type of software. When executed by processing circuitry 905, operating software 907 directs processing system 903 to operate control node computing system 900 as described herein.

In particular, request module 908 directs processing system 903 to identify a request to configure a virtual data processing cluster. This request may include a request to generate a new processing cluster, a request to add one or more nodes to a preexisting virtual cluster, or any other similar request for a virtual cluster. In response to the request, tenant module 909 directs processing system 903 to identify a tenant associated with the request. In some implementations, a LSPE may provide processing resources for multiple organizations, as well as divisions within the organizations. However, because these tenants may require processing of sensitive data, control node may be required to implement the clusters in a manner to segregate the processing nodes of the various tenant clusters.

To assist in segregating the clusters of the tenants, configuration module 910 is provided that directs processing system 903 to configure VLAN tag to IP address pairs for the cluster request. In some examples, computing system 900 may be provided with a set of IP addresses that can be dynamically allocated to processing clusters as they are required. Accordingly, rather than providing a static address to each of the clusters, the addresses may only be mapped to the cluster when processing is required. For example, a request may be received to generate an Apache Spark cluster consisting of three nodes. Computing system 900 may identify a VLAN tag associated with the tenant of the request, and associate three IP addresses to the VLAN tag for the tenant.

Once the VLAN tag to IP address pairs are identified for the cluster, communication module 911 directs processing system 903 to communicate the configuration, include the tag pairs to the LSPE. In some implementations this may include configuring the processing nodes of the cluster with the appropriate addresses, configuring gateways and routers of the LSPE to provide the VLAN to the virtual nodes, or any other similar configuration based on the IP address to VLAN tag pairs. In some examples, prior to configuring the virtual processing nodes with the VLAN configuration, the nodes may be initiated by control node computing system 900 on one or more host computing systems in the LSPE. In other examples, control node computing system 900 may identify nodes that are idle or not in use for any other cluster and provide the nodes with the VLAN configuration.

In some implementations, control node computing system 900 may further be configured to maintain DNS configurations for each of the clusters that are implemented within the environment. These DNS configurations allow each of the clusters to identify and communicate with other nodes of the cluster. In some implementations the DNS services may be implemented with control node computing system 900, however, it should be understood that in some implementations control node computing system 900 may configure one or more external systems to provide the DNS functionality. Once a DNS is configured, which associates namespaces for the nodes with their current IP addresses, the nodes may query the DNS with a namespace and have an IP address returned of the desired node. After receiving the IP address, the requesting node may make the desired communication.

Although a DNS service may be used to provide IP addresses to requesting nodes of a cluster, in some implementations, the IP addresses may be provided directly to the nodes of a cluster. Consequently, rather than querying a DNS to determine the address for another node, the node may have local access to a data structure that can be used to identify the required address for the node. The data structures on each of the nodes may be maintained or updated by control node computing system 900 to reflect the current allocation of nodes to the virtual cluster.

Figure 10:
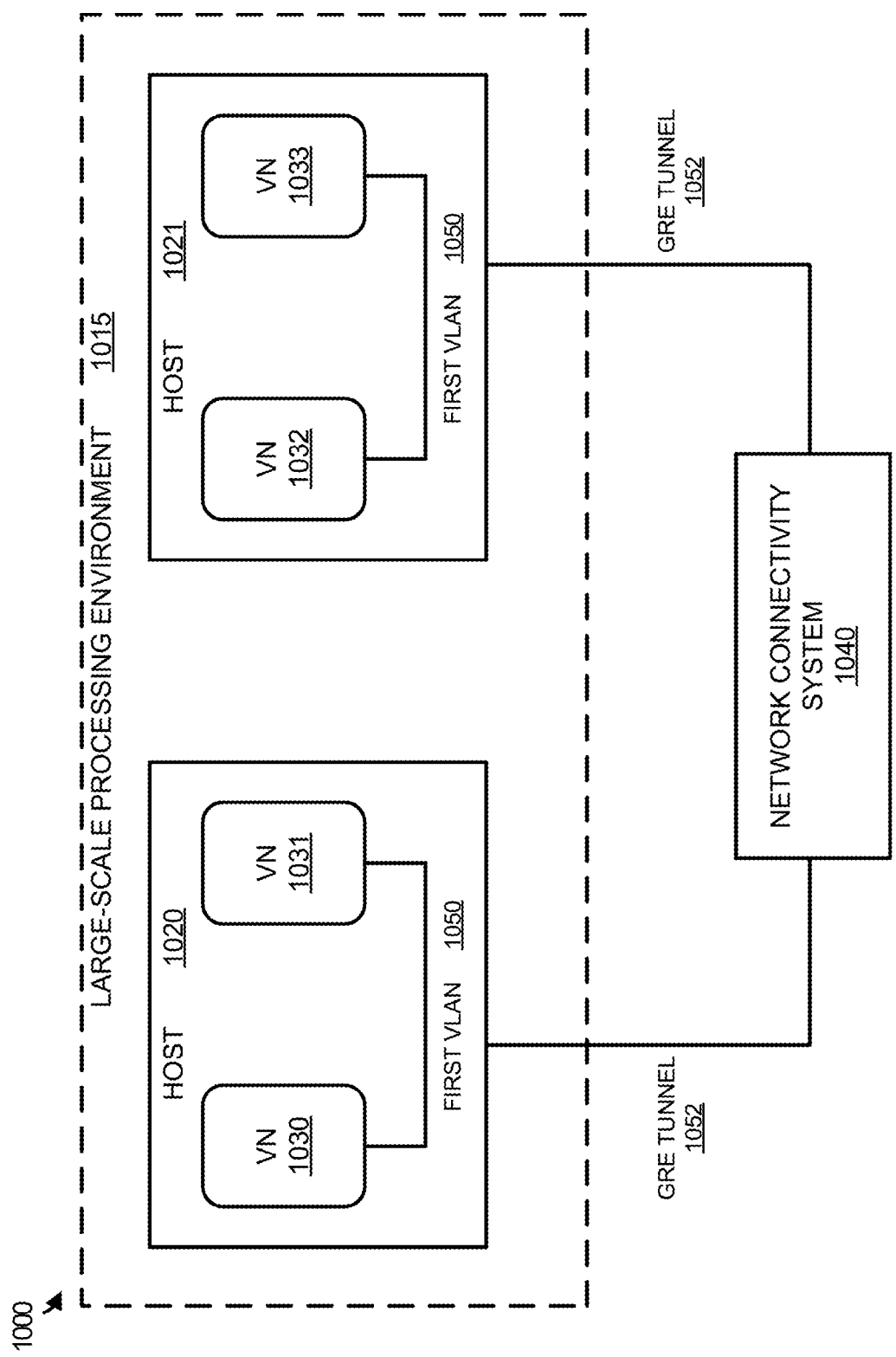
FIG. 10 illustrates a computing architecture to provide virtual processing clusters to multiple tenants.

FIG. 10 illustrates a computing architecture 1000 to provide virtual processing clusters to multiple tenants. Computing architecture 1000 includes LSPE 1015 and network connectivity system 1040. LSPE 1015 includes hosts 1020-1021, which comprise computing systems capable of providing a platform for VNs 1030-1033. VNs 1030-1033 may comprise virtual machines, containers, such as Docker or Linux containers, or some other virtual nodes, including combinations thereof. Network connectivity system 1040 may comprise switches, routers, gateways, computing systems, or any other similar computing systems to route communications between the various virtual nodes.

In the example of FIG. 10, virtual nodes 1030-1033 represent processing nodes for a tenant virtual processing cluster, wherein the nodes are distributed across multiple host computing systems. To facilitate data communications between the nodes, the nodes are segregated from other nodes within the processing environment using both a VLAN and generic routing encapsulation (GRE). In particular, a VLAN tag for first VLAN 1050 may be associated with the nodes of the individual tenant. This VLAN tag permits nodes that share a common host to communicate with one another by identifying the appropriate VLAN tag in the header for the communication. Accordingly, referring to computing architecture 1000, when VN 1030 requires a communication with VN 1031, a VLAN tag may be applied to the communication packet or packets permitting the communication to be transferred between the common host virtual nodes. This operation is similar to the operations described above with FIGS. 1-9.

In addition to the VLAN tags that are used to communicate locally within a particular host. GRE tunnel identifiers may be used to address communications between physical hosts with nodes of the same cluster. A GRE tunnel allows data packets to be encapsulated and transferred between the systems. For example, if VN 1030 were to communicate with VN 1032, the data packets may be encapsulated with a GRE tunnel identifier using a virtual switching mechanism, and transferred over network connectivity system 1040 to host 1021. Once received, the GRE identifier may be translated to the appropriate VLAN by a virtual switch on host 1021, and the data may be provided to VN 1032.

In some implementations, virtual switches may be employed within each of the hosts to determine whether a VLAN tag or a GRE tunnel identifier should be used for the communication. For example, when a communication is transferred using a VLAN tag for first VLAN 1050, a first switch may determine whether the communication is local to another node on the same host. If the communication is local, the communication will be routed to the corresponding node on the host using the first switch and the virtual Ethernet (veth) pair between the two nodes. In contrast, if it is identified that the communication is to a node on a separate host, a second switch may be employed that adds the required GRE tunnel identifier to the communication and transfers the communication over network connectivity system 1040. Once received at the other host computing system, a virtual switch within the host may translate the GRE identifier for the packet into the appropriate VLAN and provide the data packet as required to the appropriate node.

Although illustrated in the present example with a single tenant for hosts 1020-1021, it should be understood that any number of tenants might be provided on the host. These tenants' data traffic may be controlled in a similar manner to that described above with respect to VNs 1030-1033. In particular, any nodes that communicate locally on a host may use VLAN tags to direct communications to other nodes of the same tenant cluster. Further, a GRE identifier for a GRE tunnel may be used to communicate between tenant nodes on multiple host computing systems.

Figure 11:
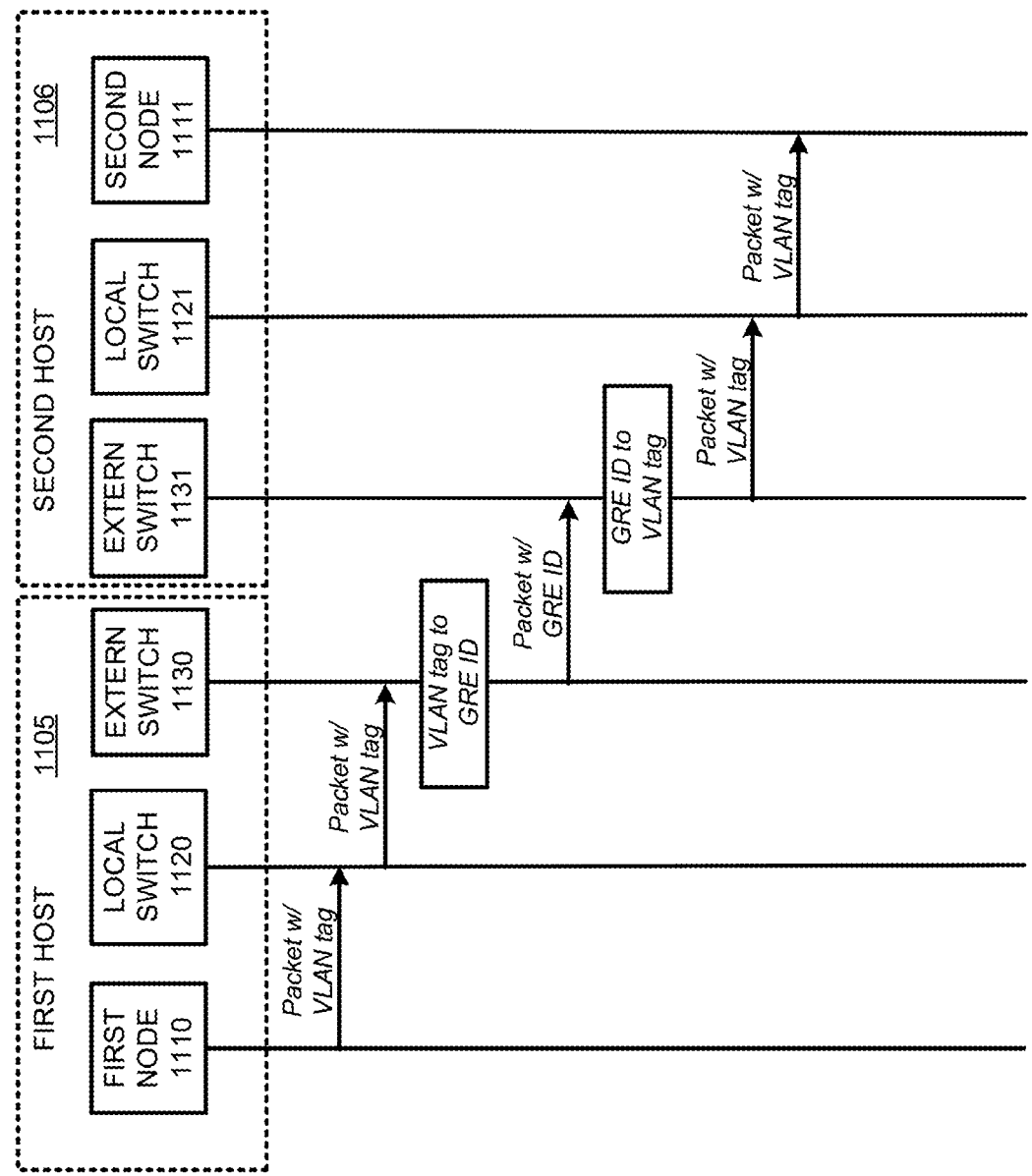
FIG. 11 illustrates a timing diagram for a data communication between processing nodes in a virtual processing environment according to one implementation.

To further demonstrate the communication interactions between nodes on different computing systems, FIG. 11 is provided. FIG. 11 illustrates a timing diagram 1100 for a data communication between processing nodes in a virtual processing environment according to one implementation. Timing diagram 1100 includes first host 1105 and second host 1106. First host 1105 includes first node 1110, local switch 1120, and external (extern) switch 1130. Second host 1106 includes second node 1111, local switch 1121, and external (extern) switch 1131. Local switches 1120-1121 and external switches 1130-1131 comprise virtual switches configured to provide communication routing for the virtual nodes of processing clusters. External switches 1130-1131 are configured to translate VLAN tags to GRE tunnel identifiers and direct data between physical host computing systems.

As described herein, clusters comprising virtual nodes are initiated on host computing systems to provide large-scale processing operations. During the operations, the nodes of the processing cluster may require communications. To facilitate the communications, switches are provided on the host computing systems, wherein the switches direct the communications to nodes that are associated with the individual tenant. In the example of FIG. 11, first node 1110 is transferring a data packet to second node 1111. As previously described, to communicate between the various nodes for a tenant, a VLAN tag may be provided to the tenant, wherein VLAN tag is provided in the header of data packets to determine which cluster the communication belongs.

Here, each of hosts 1105-1106 are provided with virtual switches that can be used to direct the communications based on the VLAN provided with the data packets. In particular, a first local switch may be used to direct or bridge communications between cluster nodes that share a host computing system, and an external switch may be used to communicate with other host computing systems that are executing nodes of the cluster. In response to receiving a data packet from first node 1110 including the VLAN tag for nodes 1110 and 1111, local switch 1120 identifies that the node required is external to first host 1105, and forwards the packet to external switch 1130.

Once external switch 1130 receives the packet, external switch 1130 translates the VLAN tag associated with the communication into a GRE identifier (ID) associated with the cluster. The GRE ID is then used to encapsulate the particular data communication and is transferred to second host 1106. Once received at second host 1106, external switch 1131 translates the GRE ID with the encapsulated packet to the appropriate VLAN tag associated with the tenant. Once the VLAN tag is identified, the VLAN tag is reapplied to the data communication and transferred to second node 1111 via local switch 1121.

While illustrated with GRE tunnels between the hosts in the present implementations, it should be understood that similar operations from FIGS. 1-9 might be used to determine addressing information for each of the nodes within the processing cluster. In particular, it should be understood that a DNS service may be provided to the cluster that permits each of the nodes to identify address locations for the individual nodes based on a namespace provided for the node. Referring to the example in FIG. 11, first node 1110 may query the DNS with a namespace identifier for second node 1111. Based on the identifier, the DNS will supply an IP address that can be used by first node 1110 to communicate with second node 1111.

In some implementations, the DNS and the switches for the host computing systems may be configured when the cluster is generated for the particular tenant. In particular, the DNS may be provided with translations between namespace identifiers for the tenant and IP addresses for the nodes allocated to the tenant, while the switches are provided with VLAN tag and GRE ID information to segregate the communications for the particular tenant. Further, in some examples, the DNS and the switches for the cluster may be modified to accommodate an addition or deletion request of nodes within the cluster. This modification may include adding or deleting IP address to VLAN tag pairs, adding or deleting namespace identifier to VLAN tag entries for the switches, or any other similar modification based on the request.

Returning to the elements of FIG. 1, LSPE includes hosts 120-122, which may comprise server computers, desktop computers, or some other similar computing hardware, including combinations thereof. Hosts 120-122 may each comprise one or more processing systems, storage systems, communication and network interfaces, user interfaces, or any other similar computing system. Hosts 120-122 include hardware and/or software capable of providing a platform for virtual nodes 130-135, wherein the nodes may comprise virtual machines, containers, such as Docker or Linux containers, or some other virtual nodes, including combinations thereof.

Control node 170 may include communication interfaces, network interfaces, processing systems, computer systems, microprocessors, storage systems, storage media, or some other processing devices or software systems, and can be distributed among multiple devices. Control node 170 may comprise one or more server computers, desktop computers, laptop computers, or any other similar computing system, including combinations thereof.

Data repositories 141-143 in data sources 140 may each include communication interfaces, network interfaces, processing systems, computer systems, microprocessors, storage systems, storage media, or some other processing devices or software systems, and can be distributed among multiple devices. Data repositories 141-143 may comprise one or more server computers, desktop computers, laptop computers, or any other similar computing systems, including combinations thereof.

LSPE 115 may communicate with data sources 140 and administration node 170 using metal, glass, optical, air, space, or some other material, including combinations thereof as the transport media. LSPE 115 may communicate with data sources 140 and administration node 170 via Time Division Multiplex (TDM), Internet Protocol (IP), Ethernet, optical networking, wireless protocols, communication signaling, or some other communication format—including combinations thereof.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method to operate a control node of a large-scale processing environment, the method comprising:
   identifying a first tenant associated with a first request to configure a virtual cluster with one or more data processing nodes, wherein the first tenant represents an organization that shares the physical resources of the large-scale processing environment;
   identifying a namespace for the first tenant;
   identifying internet protocol (IP) addresses for the one or more data processing nodes;
   generating namespace to IP address pairs for the one or more data processing nodes based on the namespace and the IP addresses;
   configuring a domain name system (DNS) for the virtual cluster with the namespace to IP address pairs, wherein the DNS is associated with the first tenant.

2. The method of claim 1 wherein the one or more data processing nodes comprise one or more virtual machines or one or more containers.

3. The method of claim 1 further comprising:
   identifying a second request to remove a data processing node from the virtual cluster;
   identifying a namespace to IP address pair for the data processing node; and
   removing the namespace to IP address pair for the data processing node from the DNS for the virtual cluster.

4. The method of claim 1 wherein the request to configure the virtual cluster with the one or more data processing nodes comprises an expand request to add the one or more data processing nodes to a preexisting virtual cluster, and wherein configuring the DNS for the virtual cluster with the namespace to IP address pairs comprises adding the namespace to IP address pairs to a preexisting DNS.

5. The method of claim 1 wherein the request to configure the virtual cluster with the one or more data processing nodes comprises a new cluster request to configure a new virtual cluster with the one or more data processing nodes.

6. The method of claim 1 further comprising initiating the one or more data processing nodes on at least one host computing system in the large-scale processing environment.

7. The method of claim 1 further comprising configuring the one or more data processing nodes with an IP address for the DNS.

8. The method of claim 1 further comprising:
   receiving a second request to configure a second virtual cluster with at least one data processing node;
   identifying a second tenant associated with the second request;
   identifying a second namespace for the second tenant;
   identifying secondary IP addresses for the at least one data processing node;
   generating second namespace to IP address pairs for the at least one data processing node based on the second namespace and the secondary IP addresses; and
   configuring a second DNS for the second virtual cluster with the second namespace to IP address pairs.

9. The method of claim 1 wherein identifying the IP addresses for the one or more data processing nodes comprises identifying, from a set of available IP addresses allocated to the large-scale processing environment, available IP addresses for the one or more data processing nodes.

10. An apparatus to manage a large-scale processing environment, the apparatus comprising:
one or more computer readable media;
a processing system operatively coupled to the one or more computer readable media; and
program instructions stored on the one or more computer readable media, that when executed by the processing system, direct the processing system to:
identify a first tenant associated with a first request to configure a virtual cluster with one or more data processing nodes, wherein the first tenant represents an organization that shares the physical resources of the large-scale processing environment;
identify a namespace for the first tenant;
identify internet protocol (IP) addresses for the one or more data processing nodes;
generate namespace to IP address pairs for the one or more data processing nodes based on the namespace and the IP addresses; and
configure a domain name system (DNS) for the virtual cluster with the namespace to IP address pairs, wherein the DNS is associated with the first tenant.

11. The apparatus of claim 10 wherein the one or more data processing nodes comprise one or more containers.

12. The apparatus of claim 10 wherein the processing instructions further direct the processing system to:
identify a second request to remove a data processing node from the virtual cluster;
identify a namespace to IP address pair for the data processing node; and
remove the namespace to IP address pair for the data processing node from the DNS for the virtual cluster.

13. The apparatus of claim 10 wherein the request to configure the virtual cluster with the one or more data processing nodes comprises an expand request to add the one or more data processing nodes to a preexisting virtual cluster, and wherein to configure the DNS for the virtual cluster with the namespace to IP address pairs, the program instructions direct the processing system to add the namespace to IP address pairs to a preexisting DNS.

14. The apparatus of claim 10 wherein the request to configure the virtual cluster with the one or more data processing nodes comprises a new cluster request to configure a new virtual cluster with the one or more data processing nodes.

15. The apparatus of claim 10 wherein the program instructions further direct the processing system to initiate the one or more data processing nodes on at least one host computing system in the large-scale processing environment.

16. The apparatus of claim 10 wherein the program instructions further direct the processing system to configure the one or more data processing nodes with an IP address for the DNS.

17. The apparatus of claim 10 wherein the program instructions further direct the processing system to:
receive a second request to configure a second virtual cluster with at least one data processing node;
identify a second tenant associated with the second request;
identify a second namespace for the second tenant;
identify secondary IP addresses for the at least one data processing node;
generate second namespace to IP address pairs for the at least one data processing node based on the second namespace and the secondary IP addresses; and
configure a second DNS for the second virtual cluster with the second namespace to IP address pairs.

18. The apparatus of claim 10 wherein, to identify the IP addresses for the one or more data processing nodes, the program instructions direct the processing system to identify, from a set of available IP addresses allocated to the large-scale processing environment, available IP addresses for the one or more data processing nodes.

19. A system for managing virtual clusters in a large-scale processing environment, the system comprising:
one or more host computing systems;
a control node configured to:
identify a tenant associated with a request to configure a virtual cluster with one or more data processing nodes, wherein the tenant represents an organization that shares the physical resources of the large-scale processing environment;
identify a namespace for the tenant;
identify internet protocol (IP) addresses for the one or more data processing nodes;
generate namespace to IP address pairs for the one or more data processing nodes based on the namespace and the IP addresses; and
configuring a domain name system (DNS) for the virtual cluster with the namespace to IP address pairs, wherein the DNS is associated with the first tenant.

20. The system of claim 19 wherein the request to configure the virtual cluster with one or more data processing nodes comprises one of: an expand request to add the one or more data processing nodes to a preexisting cluster and, a new cluster request to configure a new virtual cluster with the one or more data processing nodes.

* * * * *